Patented Nov. 2, 1937

2,097,671

UNITED STATES PATENT OFFICE 2,097,671

METHOD OF MAKING A POROUS BEARING MATERIAL

Roland P. Koehring, Dayton, Ohio, assignor, by mesne assignments, to General Motors Corporation, Detroit, Mich., a corporation of Delaware No Drawing. Application December 23, 1933, Serial No. 703,835

5 Claims. (Cl. 75—22)

This invention relates to the manufacture of rigid porous bodies from a mixture composed chiefly of powdered metals and is particularly suitable for making bearing bushings or other bearing structures which will absorb a sufficient quantity of lubricant to properly lubricate the bearing surface for a long period of use.

Porous bronze bearing structures of this type are now in wide use, and reference is made to Patent No. 1,642,347, granted September 13, 1927, to Williams and Boegehold, for a more complete disclosure of an old and well-known method of making such bearings.

In carrying out the process of making porous metal bearings the powdered ingredients are briquetted in a die or mold under high pressure and the briquettes are later sintered in a non-oxidizing atmosphere at such a temperature as will cause the metal ingredients to cohere or alloy without complete fusion and form a strong rigid structure. Ordinarily some powdered graphite is used in the mix, and this graphite remains in and gives certain desired properties to the finished bearing, and if sufficient graphite is used it also serves the important function of reducing the friction between the compressed powder and the die parts during the briquetting operation. Such reduction in friction is a great advantage in the forming of a briquetted cylindrical bushing for the following reasons: (1) a relatively thin wall cylindrical bushing may be briquetted by endwise pressure upon the powdered ingredients and yet provide a briquetted bushing of substantially uniform density from end to end since the compressed powder will slide easily upon the die walls while it is being compacted by an axially moving plunger; (2) less force is required on the briquetting plungers to properly compact the powder ingredients and there will be less friction and hence less abrasion or wear on the die parts, which will result in the dies having a longer useful life; (3) less force is required on the ejecting plunger to force the briquetted bushing endwise from the briquetting die, which again results in less wear on the dies and also in fewer cases where the bushing is broken or marred during its ejection from the briquetting die.

Now according to this invention powdered zinc stearate is added to the mix to greatly reduce the friction between the compressed powder and the die parts during the briquetting operation with the result that all the above mentioned advantages are obtained without the necessity of adding sufficient graphite to the mix for this purpose, or in fact any graphite. For certain purposes it is desirable to reduce the amount of graphite in the finished porous bronze bushing to about 2% or less by weight. With such a small percentage of graphite the briquetting friction is so great that it is exceedingly difficult and in many cases impossible to briquette a thin wall bushing by endwise acting plungers and obtain uniform density from end to end of the bushing. However, the addition of only about 1% by weight of zinc stearate powder to the mix reduces the briquetting friction sufficiently to readily obtain substantially uniform density in the briquetted bushing, as well as the other advantages of reduced friction mentioned in the preceding paragraph.

Specific examples of suitable proportions and ingredients used for porous bronze bearing bushings are given below:

A

| | Parts by weight |
|---|---|
| Copper powder | 90 |
| Tin powder | 10 |
| Graphite | 2 |
| Zinc stearate powder | 1 |

B

| | Parts by weight |
|---|---|
| Copper powder | 90 |
| Tin powder | 10 |
| Zinc stearate powder | 1 to 5 |

The above formulas are merely given as typical to illustrate the use of zinc stearate powder. Of course, the copper and tin content may be varied as desired and also other ingredients, such as metallic zinc powder and lead powder, may be added to give the desired final metal alloy according to well-known bronze formulas.

The zinc stearate contained in the briquetted bushings is decomposed during the sintering thereof and nearly all driven off leaving voids, and hence it serves the additional function of increasing the porosity of the sintered bushing. In this respect it serves the function of the salicylic acid in the method of the above-mentioned Patent No. 1,642,347, to Williams and Boegehold. The desired degree of porosity in the finished porous bushing is obtained by the percentage of zinc stearate powder added to the mix before briquetting, the greater the content of zinc stearate the greater will be the porosity of the sintered bushing.

Zinc stearate, which is a soapy-like powder, is especially suitable for the purposes of this invention due to the following: (1) it does not have the tendency to coalesce into larger masses when mixing the ingredients but can be readily dispersed uniformly throughout the other powders of the mix and a uniform porous structure and a smooth surface to the finished bearing results; (2) when used according to this invention it has better lubricating properties during the briquetting operation than oil or fatty acids (which have been used for this purpose) and hence less briquetting pressure need be used to obtain the desired density in the briquetted bushing; (3) zinc stearate is decomposed and substantially driven off in the form of reducing gases below the temperatures which are used in sintering powdered metal bushings.

Though zinc stearate is preferred, the zinc salt of oleic or palmitic acids may be used according to this invention. Zinc oleate is a greasy powder which may be readily uniformly dispersed throughout the mix during the normal mixing of the other ingredients. It is also suggested that any zinc salt of a fatty acid, which salt is in the form of a fine greasy or soapy powder, may be substituted for the zinc stearate and used according to this invention, since such zinc salts will have the advantages outlined above for zinc stearate, at least to a considerable extent.

While the form of embodiment of the present invention as herein disclosed, constitutes a preferred form, it is to be understood that other forms might be adopted, all coming within the scope of the claims which follow.

What is claimed is as follows:

1. The method of making a rigid porous bearing structure from metal powders, comprising: intimately mixing zinc stearate powder with the metal powders to form a substantially homogeneous mix, compressing the mix into a briquette in a mold under pressure, removing the compressing pressure and then subjecting the formed briquette to a temperature which will decompose and substantially drive off the zinc stearate in gaseous form leaving voids in the briquette, and then continuing the heating for a time and at a temperature which will cause the metal particles to sinter together and form a rigid porous structure.

2. The method of making a rigid porous body from a mixture of powdered solid ingredients comprising: intimately mixing zinc stearate powder with the powdered ingredients, briquetting the mix in a mold under high pressure during which the zinc stearate serves as a lubricant to facilitate the forming of the briquette to a substantially uniform density throughout its extent, removing the compression upon the formed briquette and then sintering the briquette in a non-oxidizing atmosphere at a temperature which will decompose and substantially drive off the zinc stearate in gaseous form and leave voids and cause the solid ingredients to coalesce and form a porous rigid body.

3. The method of producing a porous body comprising: briquetting a mixture of finely divided alloyable metal powders and zinc stearate powder, removing the compression upon the formed briquette and then heating the formed briquette sufficiently to decompose and substantially drive off the zinc stearate in gaseous form leaving voids in the briquette and to cause the alloyable metal powders to sinter together and form a strong rigid porous structure.

4. The steps in the method of making a rigid porous body from a mixture of powdered ingredients, comprising: intimately mixing a powdered zinc salt of a fatty acid with the other powdered ingredients, briquetting the mix in a mold under high pressure to form a briquette having a substantially uniform density throughout its extent, removing the compression upon the formed briquette and then sintering the briquette in a non-oxidizing atmosphere at a temperature which will decompose and substantially drive off the zinc salt in gaseous form leaving the briquette finely porous and cause the solid ingredients to coalesce and form a porous rigid body.

5. The method of producing a porous body comprising: briquetting a mixture of finely divided alloyable metal powders and zinc oleate powder, then heating the formed briquette sufficiently to decompose and at least partially drive off the zinc oleate leaving voids in the briquette and to cause the alloyable metal powders to alloy together and form a strong rigid porous structure.

ROLAND P. KOEHRING.